United States Patent
Advani et al.

[11] Patent Number: 5,829,982
[45] Date of Patent: Nov. 3, 1998

[54] METHOD OF MANUFACTURING A MOTION SIMULATOR, AND A MOTION SIMULATOR

[75] Inventors: Sunjoo Kan Advani, Breda; Adriaan Beukers, Heemstene; Tom Jacobus van Baten, Berkel en Rodenrys, all of Netherlands

[73] Assignee: Technische Universiteit Delft, Netherlands

[21] Appl. No.: 776,873
[22] PCT Filed: Aug. 1, 1994
[86] PCT No.: PCT/NL94/00178
   § 371 Date: Apr. 7, 1997
   § 102(e) Date: Apr. 7, 1997
[87] PCT Pub. No.: WO96/04636
   PCT Pub. Date: Feb. 15, 1996
[51] Int. Cl.$^6$ .................................................. G09B 9/14
[52] U.S. Cl. .......................... 434/58; 434/38; 434/46; 434/55
[58] Field of Search ........................... 434/38, 55, 58, 434/46

[56] References Cited

U.S. PATENT DOCUMENTS

| | | | |
|---|---|---|---|
| 3,577,659 | 5/1971 | Kail | 434/58 |
| 3,619,911 | 11/1971 | Pancoe | 434/58 |
| 3,645,011 | 2/1972 | Callamen | 434/58 |
| 4,576,577 | 3/1986 | Lam et al. | 434/58 |
| 4,753,596 | 6/1988 | Hart et al. | 434/58 |
| 4,978,299 | 12/1990 | Deane | 434/58 |
| 5,018,973 | 5/1991 | Alet et al. | 434/55 |
| 5,182,150 | 1/1993 | Carlos et al. | 434/55 |
| 5,388,991 | 2/1995 | Morris | 434/55 |
| 5,433,608 | 7/1995 | Murray | 434/55 |
| 5,511,979 | 4/1996 | Perfect et al. | 434/55 |
| 5,545,040 | 8/1996 | Lu | 434/58 |
| 5,564,985 | 10/1996 | Engstrand | 434/55 |
| 5,605,462 | 2/1997 | Denne | 434/55 |
| 5,662,523 | 9/1997 | Yasumaru et al. | 434/55 |

*Primary Examiner*—Paul J. Hirsch
*Attorney, Agent, or Firm*—Michaelson & Wallace; Peter L. Michaelson; John C. Pokotylo

[57] ABSTRACT

A method of manufacturing a motion simulator having a deck and a number of deck-supporting legs (2) that are pivotally connected with the deck in first pivot points (4). The legs are actively and continuously length-adjustable, such that the deck is capable of describing a motion envelope comprising all desired deck positions, wherein a leg envelope is determined for each leg within which the possible positions of the relevant leg are located, whereafter the common surrounding space of the legs, and in particular the interspace included between the leg envelopes is determined. A shell is then designed that at least carries the deck, which shell defines an inner space extending at least partly within the interspace between the legs (2) defined by the leg envelopes, in such a manner that in each position of the simulator, the legs are clear of the shell (1).

22 Claims, 2 Drawing Sheets

METHOD OF MANUFACTURING A MOTION SIMULATOR, AND A MOTION SIMULATOR

BACKGROUND OF THE INVENTION

The invention relates to a method of manufacturing a motion simulator having a deck and a number of deck-supporting legs pivotally connected with the deck in first pivot points, the legs being actively and continuously length-adjustable, such that the deck is capable of describing a motion envelope comprising all desired deck positions.

Motion simulators are used for simulating motions, in particular vehicle motions such as, for instance, those of aircraft, boats, trains and automobiles. Such motion simulators include a deck that is movably arranged on a number of legs. The deck can be moved within a motion envelope by changing the lengths of the legs. The motion envelope is defined by the extreme positions that can be assumed by the deck.

The deck is a flat plate, stiffened by means of a bearing beam construction. Via the beam construction, the legs are attached to the bottom side of the plate by means of pivot points. A simulation environment is built up on the top side of the deck. In this manner, during the motions of the deck, the legs remain unobstructed by any part of the part of the simulator supported by the legs. The simulation environment comprises, for instance, a cockpit of an aircraft or other vehicle, reproduced on the deck. Outside the reproduced cockpit, on the deck, means are provided for presenting a simulated environment. On the deck are further built, inter alia, an instructor's cabin, control and information control means, conditioning means for the atmosphere in the simulator, and a casing which guards the part of the simulator that is supported by the legs.

Since the deck is a flat, beam-stiffened plate construction, the advantage is achieved that the deck is relatively inexpensive and that, moreover, almost any simulation environment can be reproduced on the deck. However, this known simulator has the drawback that the deck with the simulation environment built thereon is heavy and has only a limited specific stiffnesses. An increase of the stiffnesses results in an increased weight of the construction.

Since the moving part of the simulator is heavy, strong moving means of rugged construction are necessary for the legs. Consequently, the response time of the simulator, i.e., the delay time between the provision of a control signal and the reaction of the simulator thereto, becomes unacceptably high, the more so because the high weight of the simulator causes a great inertia. These high response times, which are typically at 150 milliseconds (msec) and more, cause the simulated behavior of the vehicle to become unnatural, in particular when simulating vehicles that in reality have a very short response time, such as for instance vehicles on wheels, aircraft and the like. This results in a less effective simulation and, moreover, the operator can be adversely influenced, for instance through the occurrence of motion sickness. In principle, these high response times can at least partly be compensated through anticipation, but this is only possible for vehicle and environment characteristic input signals, not for signals inputted by the operator. Moreover, this is complicated from the viewpoint of control engineering and hence costly. A high weight of the moving part of the simulator further has an adverse effect on the natural frequency and damping of the motion simulator and on the influence of interference signals. Moreover, the part can be accelerated only to a limited extent.

A further drawback of the known simulator is that it occupies much space, as the entire leg-supported part of the simulator is located above the first pivot points and hence extends entirely above the legs. Moreover, in this construction, the center of gravity of the moving part of the motion simulator is high. Consequently, the forces and moments transmitted to the legs become very great and the motion characteristic of the platform is also adversely affected.

SUMMARY OF THE INVENTION

Hence, an object of the invention is to provide a method for the manufacture of a motion simulator of the type described in the opening paragraph, wherein the above-mentioned drawbacks are avoided while the advantages are retained. To this end, in a method according to the invention, a leg envelope is determined for each leg, within which leg envelope the possible positions of the relevant leg are located. Then, the common surrounding space of the legs, and in particular the interspace included between the leg envelopes, is determined. A shell is then designed that at least carries the deck. The shell defines an inner space extending at least partly within the interspace between the legs defined by the leg envelopes, such that in each position of the simulator, the legs are clear of the shell.

In a method according to the invention, a number of legs, for instance six, to control the motions of the part supported by the legs through leg length changes initiated by control signals is predetermined. For each leg it is determined within which area it can move, in view of the specific positioning of the legs. Such an area, which will generally be three-dimensional, is referred to as a leg envelope. Between the leg envelopes an inner space is included that is free to receive, for instance, constructional elements. In the method according to the invention, this predetermined space is optimally used in the designing of the leg-supported part of the simulator.

A shell is designed that can be supported by the legs and that partly extends between the legs. The shell is shaped such that it can never be moved against a leg within one of the leg envelopes. In other words, the part of the shell that is located between the legs always moves in the inner space between the legs. In this manner, optimum use is made of the space that is already enclosed by the legs, permitting the total building volume of the simulator to be smaller than in the case of a known simulator having corresponding possibilities of motion. The shell defines an inner space which, as a result of the construction, also partly extends between the legs. This inner space is used for arranging a simulation environment, such as for instance a mock-up of a flight-deck or a cockpit or the like. Since the shell as a constructional part defines an inner space, only the interior components of the simulation environment, such as seat supports and operating and regulating means, need be incorporated—no bearing constructional parts, wall panels and the like need be incorporated. Consequently, the building volume and building weight are reduced considerably.

In a further elaboration of the method according to the invention, the shell is manufactured as a self-supporting construction at least partly made of synthetic material, and in particular of composite material. Preferably, the shell has a shape that is substantially closed on all sides, and sandwich-shaped walls. This yields a highly rigid, very light construction which provides an optimum accommodation for arranging the different simulation components. As the shell is self-supporting, only a limited number of stiffening and supporting constructions are necessary, permitting at least the moving part of the simulator to be of a light construction. This has a large number of advantages that follow therefrom directly or indirectly.

As the moving part of the simulator is light, a relatively simple, light assembly of legs is required, and the drive means of the legs can be of a light construction. Moreover, the first pivot points can be closely spaced, enabling a compact construction, while relatively short adjusting ranges of the legs may already effect the desired motions of the shell. Further, the light construction has a low mass inertia, enabling short response times, high accelerations, a high natural frequency and good damping properties, especially because the construction is very rigid. The shell can be rendered soundproof in a simple manner, which provides good possibilities for sound simulations. Moreover, the suitable choice of material and the sandwich construction permits a proper thermal insulation to be achieved. Consequently, only a relatively small ventilation and air-conditioning device is necessary, which saves space, weight and energy during use.

In a preferred embodiment of the method according to the invention, the leg-supported top part of the simulator is built up so that the center of gravity is near, and preferably in, a plane defined by at least three first pivot points, with a perpendicular through the center of gravity always extending between the first pivot points. Due to this location of the center of gravity, the forces exerted by the leg-supported top part of the simulator are suitably reduced. Consequently, the dynamic behavior of the simulator can better be controlled and brought into line with the behavior of the corresponding real vehicle.

With the method according to the invention, a motion simulator is obtained that has an optimum ratio between building volume, inner space and weight, and very low response times can be obtained with few interferences from outside, if any, allowing a very good simulation of a vehicle behavior to be achieved.

The invention further relates to a motion simulator comprising a deck and a number of deck-supporting legs that are pivotally connected with the deck in first pivot points, the legs being actively and continuously length-adjustable by means of control means and drive means, such that the deck can describe a motion envelope comprising all desired deck positions. During use, each leg defines a leg envelope within which the possible positions of the relevant leg are located. The leg envelopes define a common surrounding space of the legs and in particular an interspace enclosed between the leg envelopes. The deck is enclosed by a shell defining an inner space that extends at least partly within the interspace between the legs defined by the leg envelopes, the arrangement being such that for each position of the simulator, the legs are clear of the shell.

Such a motion simulator has a relatively small building volume compared with the building-in space and the possibilities of motion, while the moving part of the simulator is compact and light and has a low-lying center of gravity. This enables high accelerations and motion forces at short response times by means of control and drive means of a relatively light construction, while, moreover, the control can be realized with relatively simple means. As the deck is enclosed by a shell within which all kinds of control means and the like can be built in, the motion simulator is multi-functional. In particular, due to the low weight of the moving part and the low-lying center of gravity thereof, the peripheral equipment used for the simulator can be of a light, and hence relatively inexpensive and energy-friendly, design. Moreover, the simulator can be disposed in a relatively limited space, without requiring any specific supporting measures being made. In other words, the simulator can, for instance, be disposed on a normal story floor and can, if desired, be of a portable design.

In an advantageous embodiment, the motion simulator according to the invention is characterized in that the simulator comprises ballast means, preferably located below the plane defined by the first pivot points, with which the center of gravity is settable at least in vertical direction, and preferably in horizontal and vertical directions. In this manner, the simulator can be arranged to simulate a particular vehicle, after which the center of gravity can be brought exactly into the right position by adjusting the ballast means.

In a preferred embodiment of the motion simulator according to the invention, the shell is manufactured from composite material, the shell being self-supporting, and preferably a monocoque. The shell part is provided with a window that extends in horizontal direction through approximately 180° and in vertical direction through at least approximately 40° and provides a person located in the shell part with a view of a viewing screen arranged outside the shell on which an image of a simulation environment can be presented. The viewing screen moves along with the shell during use and is preferably attached to the shell, with a collar, sealing all round, provided between the longitudinal edges of the viewing screen and the shell.

In this embodiment, the shell is designed to have a maximum stiffness at a minimum weight, due to the shape and choice of material. Since the shell is moreover self-supporting, the first pivot points can be mounted close to the shell, resulting in an extremely compact top part. Since the first pivot points are located closely together, the longitudinal changes of the legs need only be limited while substantial traveling distances of the shell can be realized nonetheless. In this way, the possible accelerations and speeds of the simulator are positively influenced. The window is designed such that any field of vision of any vehicle to be simulated can be realized within it, with the environment simulation of the relevant vehicle being presented on the viewing screen disposed outside the shell and connected therewith. In principle, the window is of oversized design. This renders the shell usable for simulations of any type of vehicle or differently shaped environment. Since the shell is self-supporting, no bearing parts such as trusses and wall panels of a vehicle to be simulated need to be built in the shell themselves. Consequently, the weight of the built-up simulator remains low. Since the screen is placed outside the shell and moves along with the shell, a proper position of the image relative to the inner space of the shell is continuously ensured. Moreover, this allows the image generation on the screen to be realized relatively simply. Since the collar abuts all round against both the shell and the longitudinal edge of the screen, influence from outside, for instance due to scattered light, is prevented, and, moreover, a sufficient sealing against noise and heat is provided.

In further elaboration, the simulator comprises a number of operating and regulating means, arranged within the shell and connected with a computer disposed inside the shell. The computer is connected, via a communication cable, with a simulation computer disposed on the firm world and adapted to generate operating and regulating signals for at least the length-adjustment of the legs.

By arranging a computer inside the shell, for recording operating signals and the like from the operating and regulating means and for transmitting them, via a communication cable, to the simulation computer fixedly arranged and vice versa, only a limited weight of measuring and control systems is necessary on board the simulator. Most operating and regulating means can be designed as electronic models, which saves weight and moreover readily enables adjustments. The computer in or on the shell and the simulation computer can communicate via a single cable, for instance a coaxial cable or glass fiber cable, so that it is no longer necessary to move heavy cable trees along with the moving part of the simulator.

The invention further relates to a method of simulating a control situation of, for instance, a vehicle, wherein an operator's environment of the vehicle is reproduced within a self-supporting shell. The shell comprises a relatively large window and is disposed on, and partly between, a number of actuators for moving the shell in six degrees of freedom. Outside the shell, a viewing screen is arranged capable of moving along therewith. The screen, viewed from an operator's position within the shell, covers at least the entire window at a distance. The window is partly blocked to obtain a field of vision corresponding to the field of vision of the operator's situation to be simulated. The relevant environment of the vehicle is presented on the viewing screen. The control environment is built up from at least electronic components and operating elements coupled to a communication computer disposed within the shell. The computer is coupled via a communication cable to a fixedly disposed simulation computer wherein the dynamic and static behavior of the vehicle to be simulated are recorded. The simulation computer controls the actuators on the basis of the signals issued by the operating elements and the associated vehicle behavior. The shell is moved by the actuators so that, at least to the perception of an operator in the shell, the movements of the shell correspond to the normal behavior of the vehicle to be simulated, the response times of the shell being shorter than 150 msec, and preferably about 0 msec. When the control situation to be simulated changes, the operator's environment within the shell is exchanged for an operator's situation that is relevant to the new control situation to be simulated. The computer program in the simulation computer, the blocking of the window and the environment to be presented on the viewing screen are adapted to the new control situation to be simulated.

This method provides a use of a motion simulator permitting simulation of all kinds of motions with the simulator through simple exchange of only those parts and systems that are different, the interior of the shell being readily adaptable to the new environment to the simulated, for instance by employing mock-up parts and decor pieces. Due to the construction of the simulator, almost any vehicle can be simulated thereby in a very effective manner.

BRIEF DESCRIPTION OF THE DRAWINGS

To explain the invention, an exemplary embodiment of a motion simulator will be described hereinafter with reference to the accompanying drawings. In these drawings.

DETAILED DESCRIPTION

Figure 1:
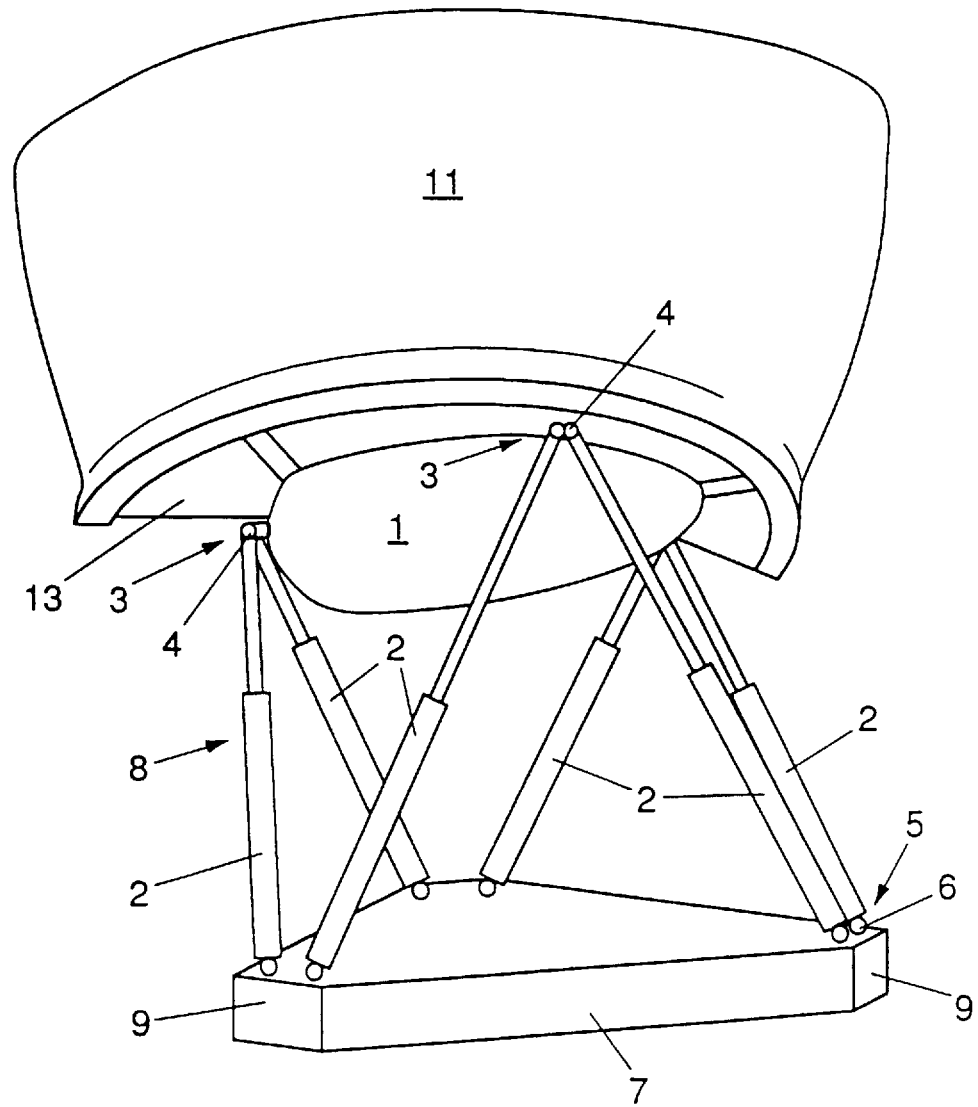
FIG. 1 is a perspective view of a simulator in assembled condition, with mounted screen.
Figure 2:
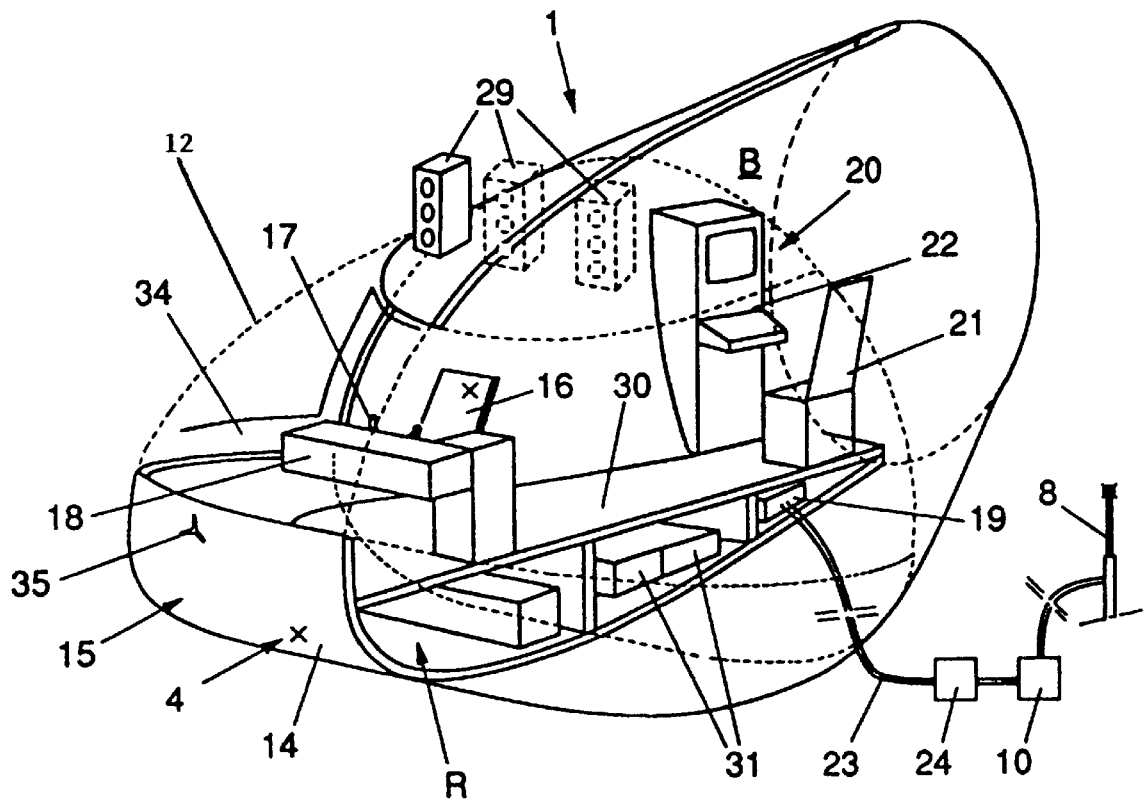
FIG. 2 is a perspective view of a shell for use in a simulator according to FIG. 1.

FIG. 1 shows a simulator comprising a shell 1 supported by six legs 2. Each leg 2 has its top end 3 connected with the shell 1 via a first pivot point 4, while each bottom end 5 of each leg 2 is connected, via a second pivot point 6, with a substantially triangular baseplate 7. Each leg 2 comprises a schematically shown assembly of a double-acting, hydraulically drivable piston and cylinder 8, with which the length of the leg 2 is dynamically settable. The second pivot points 6 are mounted in pairs on the respective angular points 9 of the baseplate 7. The first pivot points 4 are mounted in pairs on the angular points of an imaginary triangle extending through the shell 1. When the simulator is in a middle position as shown in FIG. 1, each pair of first pivot points is located approximately on a line at right angles to, and through, the center of the connecting line between two pairs of second pivot points. In other words, in this position, an at least isosceles triangle is included by two legs 2 extending from one pair of first pivot points 4 and the connecting line between the two associated second pivot points 6. FIG. 2 shows a shell 1 with the position of the first pivot points 4 relative thereto shown schematically. The hydraulically drivable (cylinder and piston) means 8 can be excited in a suitable manner via hydraulic driving means 10 schematically shown in the drawing.

Outside the shell 1, a viewing screen 11 is provided, fixedly connected therewith and extending in horizontal direction through approximately 180°, along the front side of the shell 1. Provided in the shell, at the front side thereof, is a window 12 through which the viewing screen is visible from the inner space B of the shell 1. When the simulator is being used, the screen 11 moves along with the shell 1. Abutting against the outer edge of the viewing screen 11 is a collar 13, closed all round, whose other side abuts against the outer side of the shell 1 so as to provide a lightproof, soundproof and preferably airtight sealing.

The shell 1 (FIG. 2) is constructed as a monocoque 14, i.e., the wall of the shell 1 is of one piece, with the wall moreover being of a self-supporting construction of sandwich-shaped composite material, for instance fiber-reinforced copolymers. The advantage of such construction is that at a minimum of weight, maximum stifnesses are attained, while moreover a proper insulation against noise and temperature is achieved, in particular through a suitable choice of materials, material thickness and connecting techniques. Moreover, this manner of constructing provides an extremely great freedom of design. As a matter of fact, the shell 1 can also be composed of a number of shell parts, for instance two or three, so that the manufacture is simpler.

The shell 1 is wide and low at its front side, while high and narrow at its rear side, so that two cheek-shaped convexities 15 are formed at the front side. The window 12 provided at the front side of the shell is a recess extending in horizontal direction through approximately 180° and approximately providing in vertical direction an angle of vision of at least 40° from an operator's position within the shell 1. The rear side is sufficiently high for providing an entrance to the inner space B. while the height gradually decreases from the rear side to the front. The front side of the shell 1 is substantially spherical. As a result, the describing line of a central longitudinal plane of the shell 1 is approximately half an ellipse.

In the inner space B a deck 30 is arranged, on which, near the window 12, one or more operator's positions are formed, which may comprise, inter alia, seats 16, operating means 17, information control means 18 and the like. In so far as is possible, all these components are of electronic design and coupled to a board computer 19 disposed in the shell 1. Near the rear side of the shell 1, an instructor's position 20 is included, which comprises at least one seat 21 and a number of information control means 22. The information control means 22 are also coupled to the board computer 19. Extending from the board computer 19, preferably along one of the legs 2, is a computer communication cable 23 that is connected with a simulation computer 24 disposed on the "firm world". This communication cable is a flexible cable, for instance a coaxial cable or a glass fiber cable. Via this communication cable, signals can be sent from the shell 1 to the simulation computer 24 and vice versa, for instance by using a specific protocol. Moreover, the environment images to be presented via the viewing screen 11 can thus be transmitted to projectors 29 mounted on top of the shell 1.

From the simulation computer 24, control means 10 for the hydraulic assemblies 8 are controlled by means of a simulation program and the control and regulating signals transmitted from the shell, whereby the movements of the shell 1 are regulated while at the same time signals for, inter alia, the information control means and the projectors are transmitted.

Various parts within the shell 1 are accommodated in the space R below the deck 30. As a consequence, the center of gravity Z of the leg-supported part of the simulator is relatively low. Moreover, ballast means are accommodated under the deck 30, for instance in the form of one or a series of liquid tanks 31. By means of this (these) liquid tank(s), the center of gravity Z can be brought into the plane V defined by the first pivot points 4, and preferably in the middle between the first pivot points 4.

Figure 3:
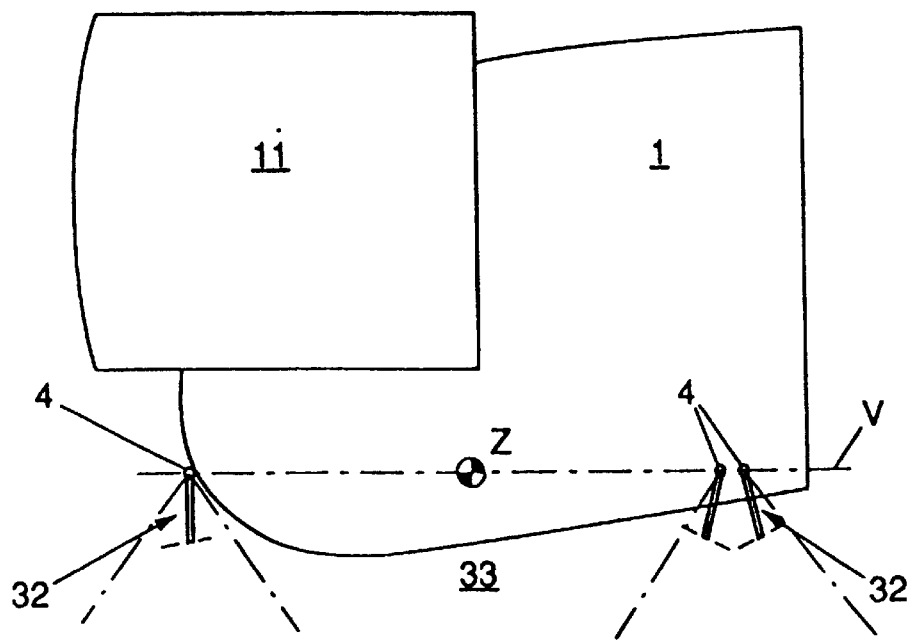
FIG. 3 is a side elevation of the leg-supported part of the simulator.

For designing the shape of the shell 1, and in particular the part located below the above-mentioned plane V, which hence extends between the legs, the maximum spaces to be covered by the legs during the movements to be carried out are first determined. These spaces are so-called leg envelopes 32, shown very schematically in FIG. 3. By these leg envelopes 32, an interspace 33 is included. The shell 1 is shaped so that it will always extend within this interspace 33 and never run against one of the legs, irrespective of the movements. The leg envelopes can be defined by the mechanical possibilities of movement of the legs 2 or in consequence of restrictions incorporated into the control means, and are preferably determined by means of a computer simulation.

The entire part of the simulator carried by the legs 2 is of a particularly light construction and weighs for instance only 2500 kg. This allows the hydraulic means 8 to be of a very light construction so that high speeds and accelerations can be realized, while, moreover, the response time of the system is very low, less than 150 msec. Response times of about 0 msec, i.e., a direct coupling of movement, are possible. Moreover, because of the low weight and the high rigidity of the apparatus as a whole, a high natural frequency of the system is realized, for instance 20 Hz and higher, while the influence of interference signals is almost eliminated and a good damping characteristic is obtained. This renders the simulator suitable for almost any motion simulation, while, moreover, relatively high-frequent input signals can be used, which is not possible with known simulators.

The motion simulator can be used as follows.

Within the shell 1, one or more operator's positions are constructed which, at least as far as the set-up is concerned, correspond to the actual or desired vehicle situation. In this connection, maximum use is made of electronic equivalents of mechanical means. Near the rear side of the shell, an instructor's position 20 is arranged. Via the board computer, the operator's position(s) and instructor's position are connected with the simulation computer, wherein a computer program is installed that controls the simulator and also the projectors for projecting images onto the viewing screen. Moreover, via the simulation computer, information control means and the like can be controlled in the shell. Further, by simple means, the interior of the vehicle to be simulated is reproduced within the shell, for instance with decor pieces 34 made of, for instance, wood, cardboard, plastic, textile or paper. This involves, among other things, temporarily covering a part of the window so that to a person inside the shell the field of vision through the open part of the window corresponds to the field of vision in the real vehicle.

After the shell has been equipped, the center of gravity is set by means of the ballast means. Since the part of the simulator that is supported and moved by the legs is light, even in equipped condition, and since the center of gravity is already relatively low because a part of the inner space, comprising relatively heavy components, lies between the legs under the plane defined by the first pivot points, only little weight is needed as ballast. A motion simulation can then be started.

In particular, due to the low response times possible, high speeds and accelerations that can be realized, high natural frequency, good damping, low center of gravity and relatively short lengths of movement for the hydraulic means, influences of motion can be incorporated into the simulation that are not possible in the known simulators, such as vehicle loading influences on the motion characteristics, maximum braking decelerations, vehicle failures and the like. Because the shell is an integral constructional element, the simulator is multifunctional. All types of vehicles can be simulated through a simple exchange of the interior and the control programs. Moreover, the use of the simulator requires relatively little energy. Accordingly, the simulator can be used in a simple manner, is relatively inexpensive to purchase, maintain and use, and in addition requires relatively slight constructional measures in respect of installation. Further, the simulator has a small building volume while all positions and changes of positions desired can be realized therewith.

Provided in and/or on the shell 1 and, if necessary, at other locations in the simulator, such as for instance in the legs 2, are a number of strain gauges 35, preferably in the form of strain gauge rosettes. With these strain gauges, the strains occurring during motion simulations can be measured and translated into stresses arising. These data can be used, directly or indirectly, for regulating the motion characteristic of the simulator. For instance, stresses in the real vehicle that occur during particular vehicle movements, for instance in the case of oversteerings, breaking loads and the like, can be measured beforehand. During the simulation, comparable vehicle movements are then simulated and the strains arising are measured, whereupon the simulation program is provided with these data. Then, each time when comparable stress patterns are registered during a simulation, a warning signal is given or a matching fracture is effected, for instance, whereafter the control characteristic of the vehicle to be simulated is adjusted to the damage. In this manner, the aircraft can for instance be stalled during an aircraft simulation, as a consequence of which an aileron may break off. The control characteristic of the simulator is then adjusted thereto. In this connection, the use of strain gauges 35 has the advantage that they are robust and inexpensive, can readily be accommodated in the shell 1 and, moreover, have a very short response time. Other than in the case where, for instance, positioning and accelerations means are used, no calculations, other than direct calculations from a material constant, are needed for measuring the stresses. As a matter of fact, other means can of course also be used for registering the stresses arising.

The invention is by no means limited to the embodiments shown and described. Many variants are possible within the purview of the invention. For instance, the shell can be shaped differently and for instance be composed of several parts, with parts possibly being exchangeable. Further, other leg configurations and motion means can be provided. Moreover, a different window may be provided and, of course, the arrangement of the parts in the shell shown in the drawing can be adjusted as required.

What is claimed is:

1. A motion simulator comprising:
   a) a deck;
   b) a base plate;
   c) a number of deck-supporting legs, each of the deck-supporting legs having a first end pivotally connected with the deck in a first pivot point, and a second end being pivotably connected to the base plate in a second pivot point;
   d) control means and drive means for actively and continuously adjusting the lengths of the deck-supporting legs, such that the deck can describe a motion envelope comprising all desired deck positions, each of the deck-supporting legs defining, during use, a leg envelope within which the possible positions of the relevant deck-supporting leg are located, said leg envelopes defining a common surrounding space of the legs, and an interspace enclosed between the leg envelopes wherein the control means and drive means are constructed for allowing movement of the deck in six degrees of freedom; and
   e) a shell defining an inner space for accommodating operating and regulating means and enclosing the deck wherein the inner space extends partly within the interspace between the deck-supporting legs defined by the leg envelopes, such that for each position of the simulator, the deck-supporting legs are clear of the shell, wherein the shell extends between the deck-supporting legs so that a center of gravity of the deck and shell of the simulator is near a plane defined by at least three of the first pivot points, between the at least three first pivot points and wherein part of the deck and shell of the simulator is movable above and over the legs during use.

2. A motion simulator according to claim 1 further comprising ballast means for setting the center of gravity at least in a vertical direction defined perpendicular to the base plate.

3. A motion simulator according to claim 2 wherein the ballast means are adapted to set the position of the center of gravity in a horizontal direction defined parallel to the base plate, and the vertical direction.

4. A motion simulator according to claim 1 wherein the shell is at least partly manufactured from synthetic composite material, the shell being self-supporting.

5. A motion simulator according to claim 1 wherein the shell includes:
   a viewing screen disposed outside the shell on which an image of a simultation environment can be presented; and
   a window extending in a horizontal direction defined parallel to the base plate through approximately 180° and in a vertical direction defined perpendicular to the base plate through at least approximately 40° and providing a person located in the shell with a view of the viewing screen.

6. A motion simulator according to claim 5 wherein the viewing screen moves along with the shell.

7. A motion simulator according to claim 1 further comprising: a number of operating and regulating means arranged within the shell;
   a computer arranged within the shell and connected with the operating and regulating means;
   a regulating computer disposed on the firm world and adapted to generate operating and regulating signals for at least adjusting a length of the deck-supporting legs; and
   a communication cable connecting the computer and the regulating computer.

8. A motion simulator according to claim 1 wherein the number of deck-supporting legs is six wherein the baseplate is triangular and the second pivot points are mounted in pairs on angular points of the triangular baseplate, wherein the six first pivot points are mounted in pairs on the shell on angular points of an imaginary triangle, and wherein the drive means include an assembly of a hydraulic cylinder and a piston, arranged in each of the deck-supporting legs, whereby the length of each of the deck-supporting legs is settable, the shell and deck of the simulator weigh less than 5000 kg and the distance from the center of gravity of the shell and deck to the plane defined by the first pivot points is less than 1 m.

9. A motion simulator according to claim 1 wherein the shell accommodates an instructor's position comprising a seat and a number of information control means.

10. A motion simulator according to claim 1 further comprising means for measuring strains arising in the motion simulator, said means for measuring being connectable to the simulation computer and being arranged on the shell.

11. A motion simulator according to claim 10 wherein the means for measuring comprise a number of scattered strain gauges.

12. The motion simulator of claim 2 wherein the ballast means are located below the plane defined by the first pivot points.

13. The motion simulator of claim 4 wherein the shell is a monocoque.

14. The motion simulator of claim 6 further comprising a collar, provided between longitudinal edges of the viewing screen and the shell, for providing a sealed attachment of the viewing screen to the shell.

15. The motion simulator of claim 8 wherein the distance from the center of gravity of the shell and deck to the plane defined by the first pivot points is 0 m.

16. The motion simulator of claim 11 wherein the strain gauges are grouped as rosettes.

17. The method of claim 21 wherein the synthetic material is a composite material.

18. The motion simulator of claim 8 wherein the shell and deck of the simulator weigh less than 2500 kg.

19. A method of manufacturing a motion simulator having a deck and a number of deck-supporting legs that are pivotally connected with the deck in first pivot points, the legs being actively and continuously length-adjustable, such that the deck is capable of describing a motion envelope comprising all desired deck positions, the method comprising steps of:
   a) determining a leg envelope for each leg within which the possible positions of the relevant leg are located;
   b) determining an interspace included between the leg envelopes;
   c) designing a shell that at least carries the deck, said shell defining an inner space extending at least partly within the interspace between the legs defined by the leg envelopes, such that, in each position of the simulator, the legs are clear of the shell.

20. A method according to claim 19 further comprising a step of:

forming the shell as a self-supporting construction.

21. A method according to claim 19 further comprising a step of:

manufacturing the shell, at least partly, from synthetic material.

22. A method according to claim 19 further comprising a step of:

providing the shell with a sandwich-shaped wall.

* * * * *